US008873562B2

(12) United States Patent
Choi et al.

(10) Patent No.: US 8,873,562 B2
(45) Date of Patent: Oct. 28, 2014

(54) APPARATUS AND METHOD FOR MEDIA DATA CLASSIFICATION IN MOBILE COMMUNICATION SYSTEM

(75) Inventors: Gyu-Il Choi, Suwon-si (KR); Joon-Ho Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1485 days.

(21) Appl. No.: 12/007,633

(22) Filed: Jan. 14, 2008

(65) Prior Publication Data

US 2008/0171530 A1 Jul. 17, 2008

(30) Foreign Application Priority Data

Jan. 17, 2007 (KR) .................. 10-2007-0005016

(51) Int. Cl.
*H04W 76/06* (2009.01)
*H04L 29/06* (2006.01)
*H04W 60/00* (2009.01)
*H04W 76/02* (2009.01)
*H04W 80/10* (2009.01)
*H04W 84/04* (2009.01)
*H04W 88/16* (2009.01)

(52) U.S. Cl.
CPC ....... *H04L 65/1069* (2013.01); *H04L 29/06217* (2013.01); *H04W 76/064* (2013.01); *H04W 60/005* (2013.01); *H04W 76/02* (2013.01); *H04W 80/10* (2013.01); *H04W 84/04* (2013.01); *H04W 88/16* (2013.01); *H04L 65/1016* (2013.01)
USPC ...................... 370/395.2; 370/328; 455/422.1

(58) Field of Classification Search
CPC ..................... H04L 29/06217; H04L 65/1016; H04T 2001/107
USPC ................ 370/310.2, 328–339, 349, 395.21; 455/405, 406, 422.1
See application file for complete search history.

(56) References Cited

U.S. PATENT DOCUMENTS

2006/0045071 A1 * 3/2006 Vimpari et al. ............... 370/352

OTHER PUBLICATIONS

Ericsson, Errors in NP-030054 which need resolution, 3GPP TSG CN Plenary Meeting #19 (NP-030148), Mar. 12, 2003, 3GPP.*
3GPP, 3rd Generation Partnership Project; Technical Specification Group Services and System Aspects; IP Multimedia Subsystem (IMS); Stage 2 (Release 5), 3GPP TS 23.228 V5.15.0, Jun. 2006, 3GPP.*
Nokia, SBLP and non-realtime PDP Contexts, Nov. 15, 2004-Nov. 20, 2004, 3GPP.*
3GPP TS 24.008 v7.6.0, 3rd Generation Partnership Project; Technical Specification Group Core Network and Terminals; Mobile Radio Interface Layer 3 Specification; Stage 3, Dec. 2006.*

* cited by examiner

*Primary Examiner* — Hoon J Chung
(74) *Attorney, Agent, or Firm* — Roylance, Abrams, Berdo & Goodman, L.L.P.

(57) ABSTRACT

A media data classification is provided. A Serving GPRS Supporting Node (SGSN) for indicating an IP Multimedia Subsystem (IMS) data flow in a mobile communication system includes a communication module for communicating with other nodes; and a media flow manager for communicating with the other nodes through the communication module, receiving a Packet Data Protocol (PDP) context activation message, and transmitting a PDP context generation message by including information indicative of IMS data when there is the information indicative of the IMS data.

13 Claims, 15 Drawing Sheets

| 8 | 7 | 6 | 5 | 4 | 3 | 2 | 1 | |
|---|---|---|---|---|---|---|---|---|
| colspan="8" | PROTOCOL CONFIGURATION OPTIONS IEI | OCTET 1 |
| colspan="8" | LENGTH OF PROTOCOL CONFIG. OPTIONS CONTENTS | OCTET 2 |
| 1 EXT | 0 | 0 SPARE | 0 | 0 | CONFIGURATION PROTOCOL | | | OCTET 3 |
| colspan="8" | PROTOCOL ID 1 | OCTET 4 / OCTET 5 |
| colspan="8" | LENGTH OF PROTOCOL ID 1 CONTENTS | OCTET 6 |
| colspan="8" | PROTOCOL ID 1 CONTENTS | OCTET 7 / OCTET M |
| colspan="8" | .... | OCTET M+1 / OCTET M+2 |
| | | OCTET M+3 |
| | | OCTET M+4 / OCTET N |
| colspan="8" | ... | OCTET N+1 / OCTET W |
| colspan="8" | CONTAINER ID 1 | OCTET W+1 / OCTET W+2 |
| colspan="8" | LENGTH OF CONTAINER ID 1 CONTENTS | OCTET W+3 |
| colspan="8" | CONTAINER ID 1 CONTENTS | OCTET W+4 / OCTET X |
| | .... | |

APPARATUS AND METHOD FOR MEDIA DATA CLASSIFICATION IN MOBILE COMMUNICATION SYSTEM

PRIORITY

This application claims priority under 35 U.S.C. §119(a) from Korean Patent Application No. 2007-5016 filed on Jan. 17, 2007, in the Korean Intellectual Property Office, the entire disclosure of which is herein incorporated by reference.

BACKGROUND OF THE INVENTION

1. Field of the Invention

The present invention relates generally to a media data classification. More particularly, the present invention relates to an apparatus and a method for classifying IP Multimedia Subsystem (IMS)-based media data when a mobile communication system uses a data service.

2. Description of the Related Art

FIG. 1 illustrates a connection between a general Gateway GPRS Support Node (GGSN) and a Packet Data Protocol (PDP) context.

In a 3rd Generation Partnership Project (3GPP)-based IP Multimedia Subsystem (IMS) of FIG. 1, as generating a primary PDP context, the GGSN 120 determines whether to use a corresponding primary PDP context only for an IMS signaling or for general purposes by examining a Protocol Configuration Options (PCO) field in a message received from an IMS terminal 110.

The GGSN 120 of FIG. 1 can transmit signaling and data not only over the Internet but also over IMS networks. The GGSN 120 can have a plurality of primary/secondary PDP contexts with the terminal 110. The GGSN 120 can support up to eleven primary/secondary PDP contexts for a single terminal.

In an IMS based on the 3GPP Release 6, as generating a secondary PDP context, the IMS terminal 110 transmits a message including an authorization_token generated by a Policy Decision Function (PDF)/Policy and Charging Rules Function (PCRF) 142 to the GGSN 120. Hence, the GGSN 120 can acquire that the corresponding secondary PDP context contains the IMS-based media.

In an IMS based on the 3GPP Release 7, when the primary PDP context is generated, the GGSN 120 can determine whether not only the primary PDP context but also the following secondary PDP context are dedicated to the IMS by examining an IMS Access Point Name (APN) received from the terminal 110.

FIG. 2 illustrates a conventional PDP context generation dedicated to IMS signaling.

As generating a primary PDP context dedicated to IMS signaling (step 1), the GGSN 230 maps a secondary PDP context only to the IMS when the IMS APN is included. Herein, when the primary PDP context, which is not for a new IMS, is generated (step 11), an IP address should be allocated to the MS 210 using a general APN.

FIG. 3 illustrates a conventional PDP context generation (steps 1~14) for the general-purpose signaling including the IMS APN.

As generating the general-purpose primary PDP context which includes IMS APN (step 1), non-IMS service can be provided through the primary PDP context.

However, specific contents service is not available using the secondary PDP context. That is, the secondary PDP context is used only for the IMS service.

FIG. 4 illustrates a conventional PDP context generation (steps 1~8) of the general-purpose signaling without the IMS APN.

When a general-purpose primary PDP context (step 1) which includes no IMS APN is generated, the GGSN cannot determine whether a secondary PDP context to be generated is used for the IMS service or not.

As discussed above, to use a new non-IMS service after generating the primary PDP context dedicated to the IMS signaling, the terminal needs to generate a new general-purpose primary PDP context. For doing so, a new IP address on the primary PDP context basis should be allocated to the terminal.

The IMS structure based on the 3GPP Release 6 uses an authorization_token to determine whether the secondary PDP context is used for the IMS. In doing so, it is required that the PDF generate and transmit the authorization_token to the Proxy (P)-CSCF during a Session Initiation Protocol (SIP) signaling. Disadvantageously, this causes latency.

In the EMS based on the 3GPP Release 7, when the IMS terminal uses the IMS signaling and the non-IMS service by generating the general-purpose primary PDP context, the GGSN cannot determine whether the secondary PDP context to be generated includes IMS media data or non-IMS media data.

When the terminal performs an IMS service deregistration, the PDP context dedicated to the IMS is deleted. When the primary PDP context dedicated to the IMS signaling is generated, the PDP context is deleted. Yet, when the primary PDP context is defined for the general purposes, there is no method suggested for processing such a primary PDP context.

Accordingly, there is a need for an improved apparatus and method for classifying media data in a mobile communication system.

SUMMARY OF THE INVENTION

Exemplary embodiments of the present invention substantially solve at least the above problems and/or disadvantages and provide at least the advantages described below. Accordingly, an aspect of exemplary embodiments of the present invention is to provide an apparatus and a method for classifying media data in a mobile communication system.

It is another aspect of an exemplary embodiment of the present invention to provide an apparatus and a method for providing not only IMS signaling but also non-IMS service using a general-purpose primary PDP context in an IMS, and for determining whether a secondary PDP context generated subsequently carries media data for the IMS service or the non-IMS service without a separate authorization_token generated by a PDF.

According to one aspect of an exemplary embodiment of the present invention, there is provided an apparatus and method for defining a new field value to be applied to a PCO field when a secondary PDP context is generated in an IMS, providing a service flow using the new field value, and determining whether a secondary PDP context generated subsequently carries media data for the IMS service or the non-IMS service without a separate authorization_token generated by a PDF.

The above aspects are achieved by providing a system for indicating an IP Multimedia Subsystem (IMS) data flow in a mobile communication system. The system includes a terminal for, after a primary Packet Data Protocol (PDP) context for general purposes is generated, transmitting a PDP context activation message including information indicative of IMS data when a secondary PDP context to be used in an IMS is generated; a Serving GPRS Supporting Node (SGSN) for receiving the secondary PDP context activation message and transmitting a secondary PDP context generation message including the information when the information indicative of the IMS data is contained; and a Gateway GPRS Support Node (GGSN) for receiving the secondary PDP context generation message and determining that the secondary PDP context carries IMS data when there is the information indicative of the IMS data.

According to another aspect of an exemplary embodiment of the present invention, a terminal for indicating an IMS data flow in a mobile communication system includes a communication module for communicating with other nodes; and a media flow manager for communicating with the other nodes through the communication module and transmitting a PDP context activation message including information indicative of IMS data when a secondary PDP context to be used in an IMS system is generated after a general-purpose primary PDP context is generated.

According to a further aspect of an exemplary embodiment of the present invention, a GGSN for indicating an IMS data flow in a mobile communication system includes a communication module for communicating with other nodes; and a media flow manager for communicating with the other nodes through the communication module, receiving a secondary PDP context generation message, and determining that the secondary PDP context carries IMS data when there is information indicative of IMS data.

Other objects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description when taken in conjunction with the accompanying drawings in which:

FIG. 14 illustrates a message format according to an exemplary embodiment of the present invention.

Throughout the drawings, the same drawing reference numerals will be understood to refer to the same elements, features, and structures.

DETAILED DESCRIPTION OF EXEMPLARY EMBODIMENTS

The matters exemplified in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention provides an apparatus and a method for classifying media data in a mobile communication system.

According to an exemplary embodiment of the present invention, an IP Multimedia Subsystem (IMS) terminal can provide a user with not only IMS service but also non-IMS service (Internet). Hereafter, the IMS terminal is referred to merely as a terminal.

When generating a primary Packet Data Protocol (PDP) context, the terminal can choose whether to use it for only an IMS signaling or for general purposes, and choose whether to use a primary PDP context including an Access Point Name (APN). Also, as generating a secondary PDP context, the terminal can indicate whether a Protocol Configuration Options (PCO) field contains a media flow for the IMS.

A Gateway GPRS Support Node (GGSN) generates a primary PDP context requested by the terminal for only the IMS signaling or for the general purposes. When the primary PDP context is generated for general purposes, the GGSN does not delete the corresponding primary PDP context even in an IMS deregistration. When the primary PDP context includes no IMS APN, the GGSN determines the transmission of media data for the IMS service using the PCO field value in the secondary PDP context.

A Proxy (P)-Call Session Control Function (CSCF) serves as a contact point for the terminal to access the IMS network. A Policy Decision Function (PDF)/Policy and Charging Rules Function (PCRF) determines a Quality of Service (QoS) in the IMS network and provides the determined QoS to the GGSN. The GGSN requests the QoS determination to the PDF/PCRF and applies the QoS generated by the PDF/PCRF to generate the PDP context.

For doing so, it is assumed that the IMS APN allows only I MS calls and that the general PAN allows IMS calls and non-IMS calls.

Figure 1:
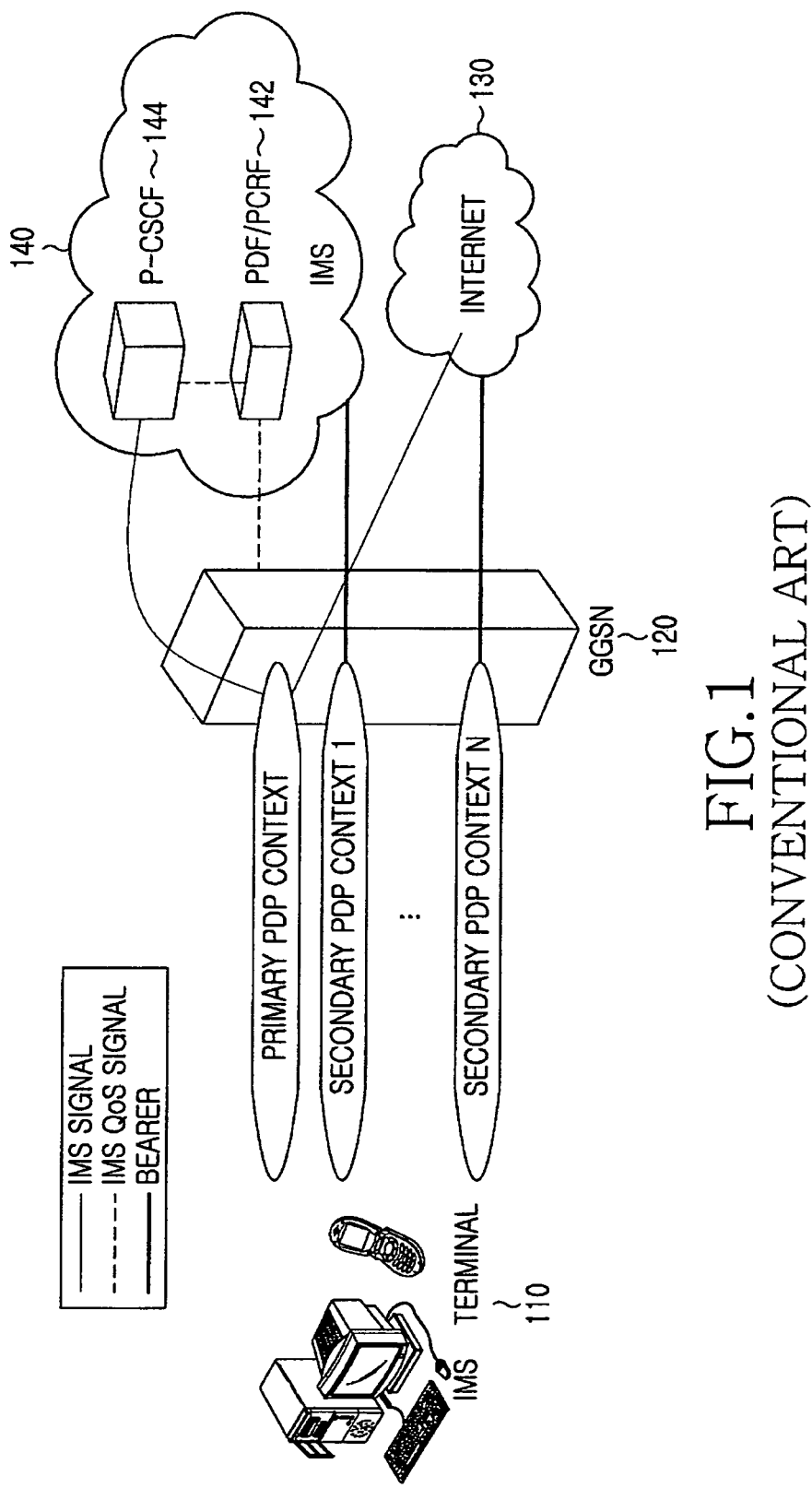
FIG. 1 illustrates a general GGSN and PDP context connection.
Figure 2:
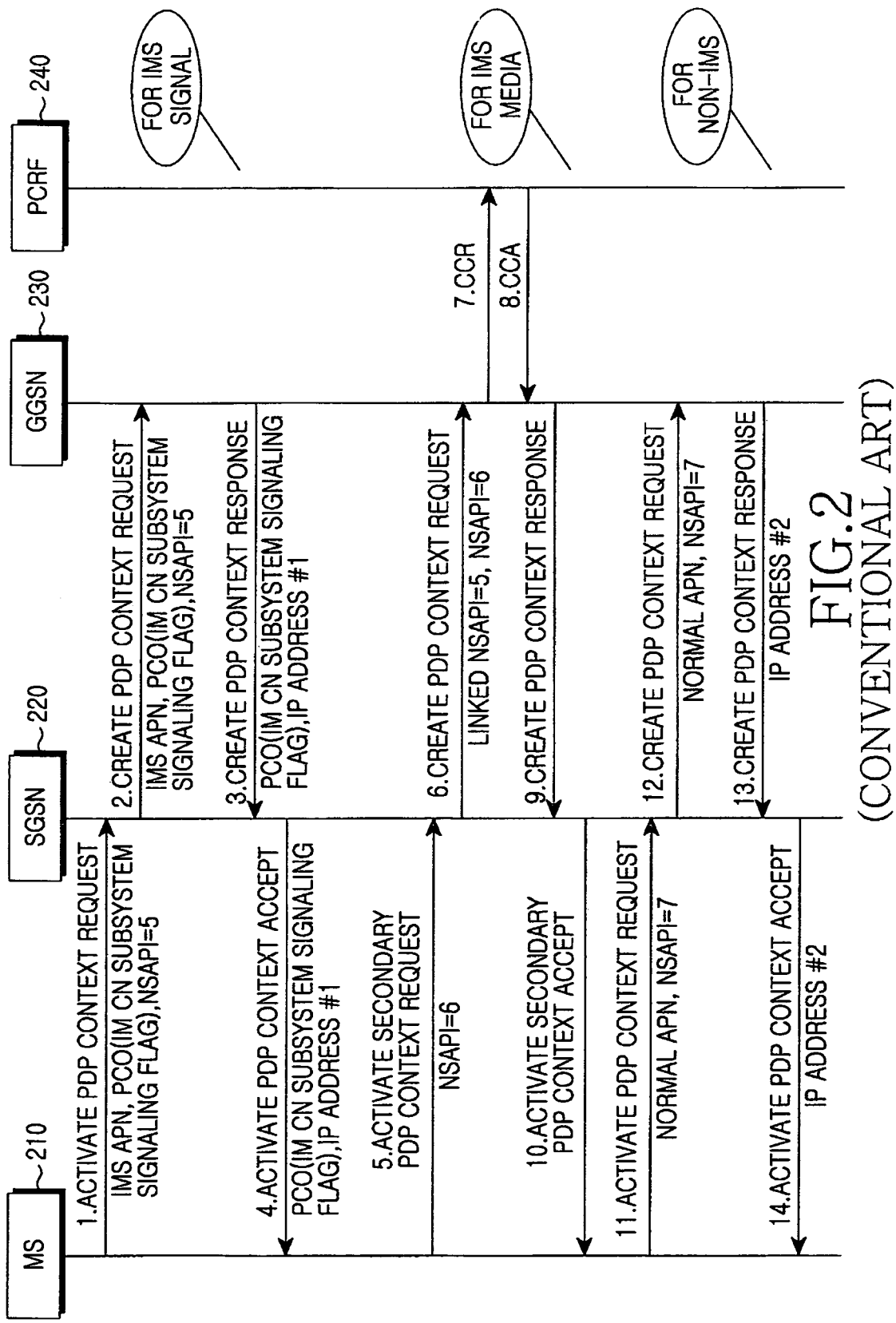
FIG. 2 illustrates a conventional PDP context generation dedicated to the IMS signaling.
Figure 3:
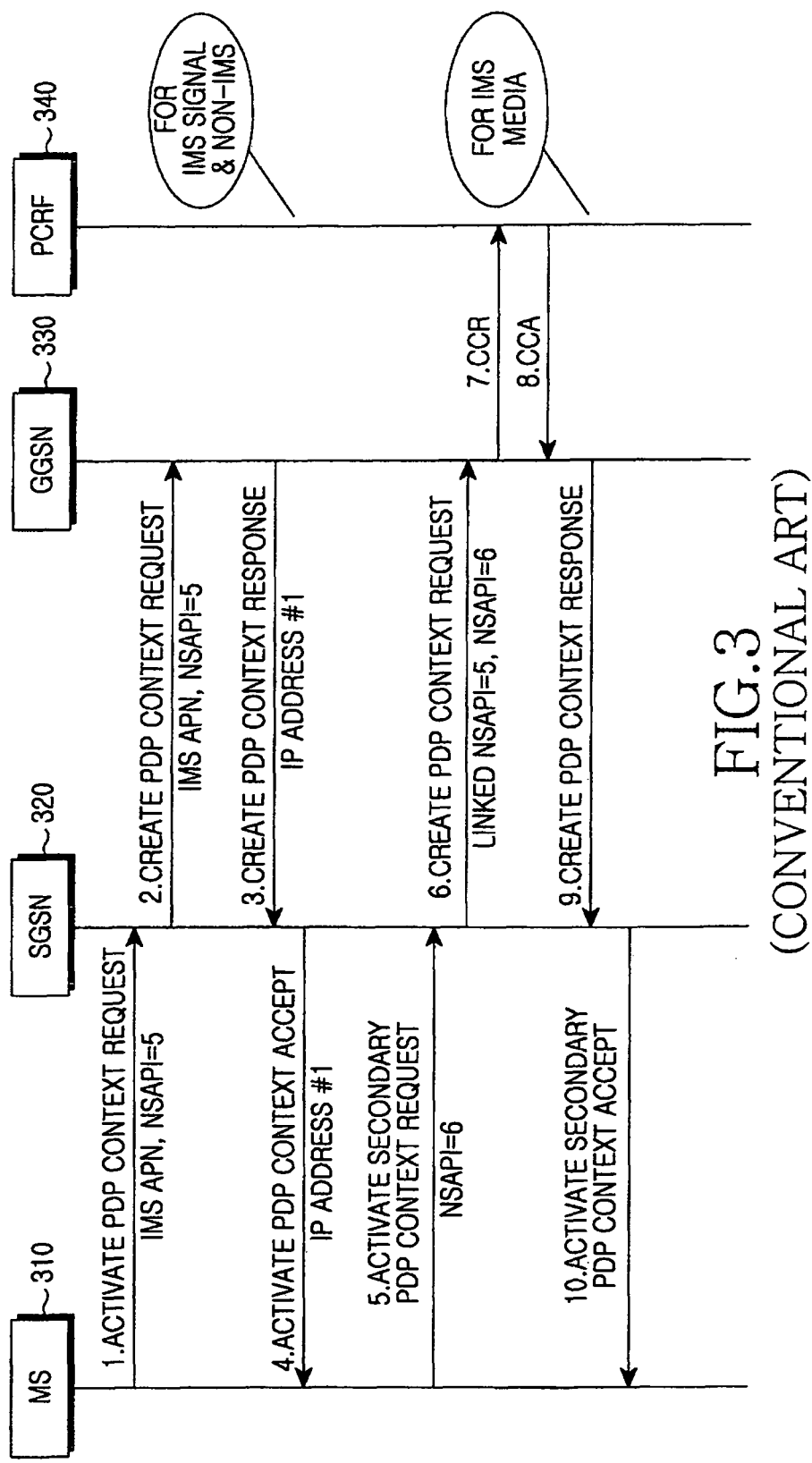
FIG. 3 illustrates a conventional PDP context generation including the IMS APN for the general-purpose signaling.
Figure 4:
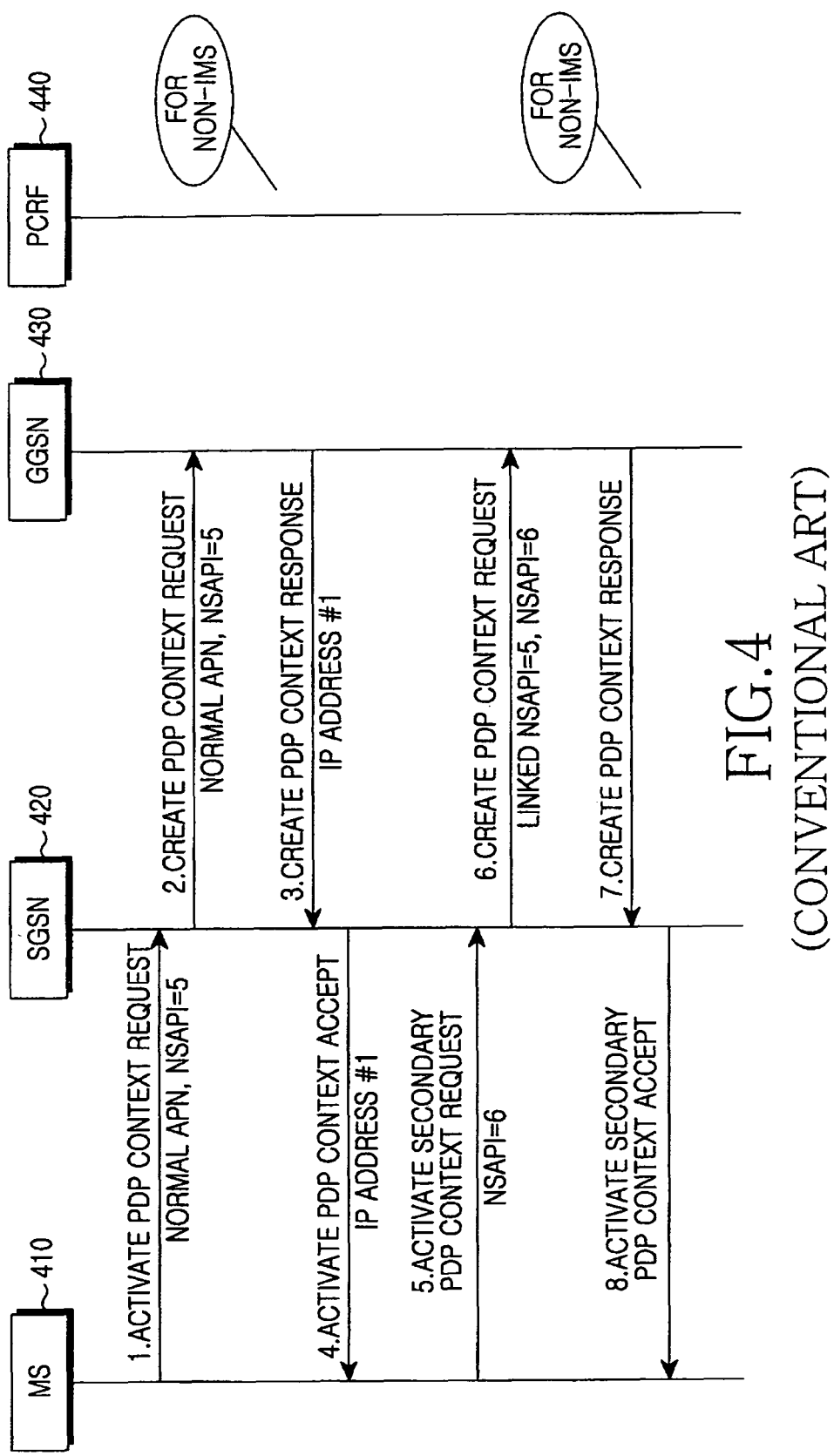
FIG. 4 illustrates a conventional PDP context generation for the general-purpose signaling without the IMS APN.
Figure 5:
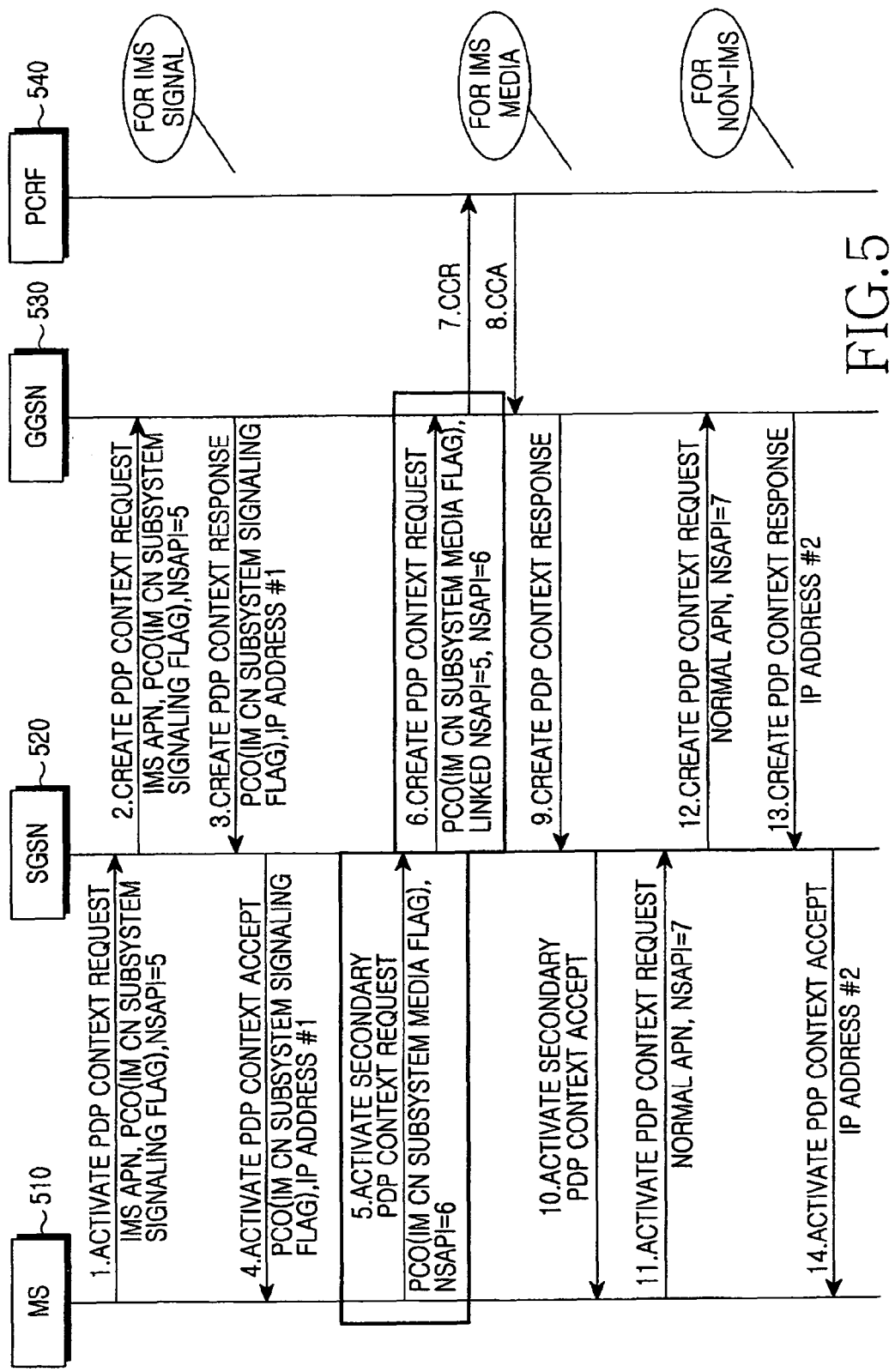
FIG. 5 illustrates a PDP context generation dedicated to IMS signaling according to an exemplary embodiment of the present invention.

FIG. 5 illustrates a PDP context generation (steps 1~14) dedicated to IMS signaling according to an exemplary embodiment of the present invention.

When generating the primary PDP context dedicated to the IMS signaling, which includes the IMS APN (steps 1 and 2), the GGSN can accurately map the secondary PDP context to the IMS. In the exemplary embodiment of the present invention, a PCO "IM CN Subsystem Media Flag" is used to indicate just the IMS signaling.

To generate a new primary PDP context not for the IMS, a separate IP address has to be allocated to the terminal using a separate general APN.

Figure 6:
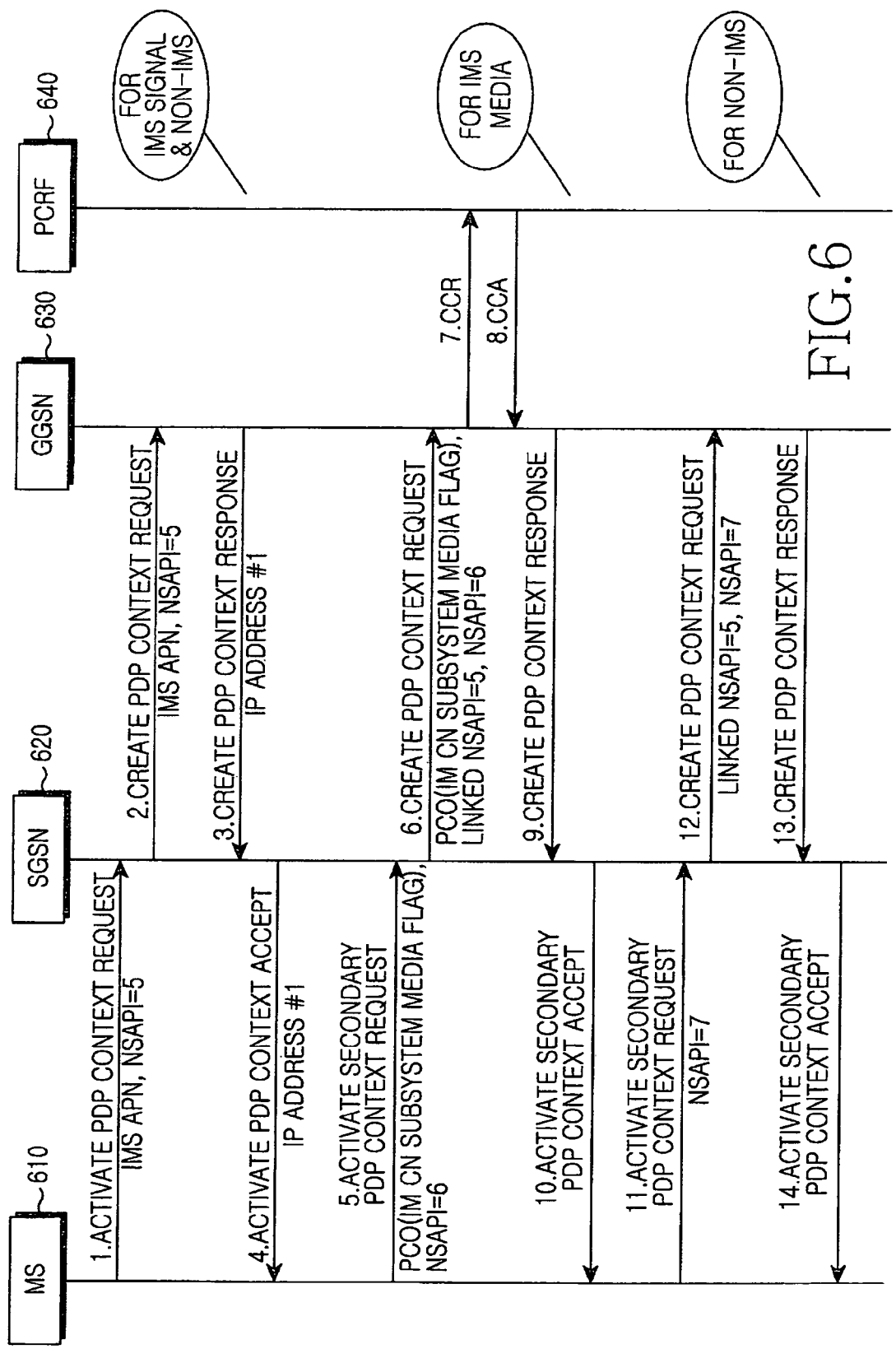
FIG. 6 illustrates a PDP context generation of the general-purpose signaling including IMS APN according to an exemplary embodiment of the present invention.

FIG. 6 illustrates a PDP context generation (steps 1~14) of the general-purpose signaling including IMS APN according to an exemplary embodiment of the present invention.

When generating a primary PDP context for the general purposes (steps 1 and 2) which includes the IMS APN and a secondary PDP context including IM CN Subsystem Media Flag (steps 5 and 6), the GGSN determines that media data for the IMS service is included. When the IM CN Subsystem Media Flag is not included, the GGSN determines that media data for the IMS service is not included.

Figure 7:
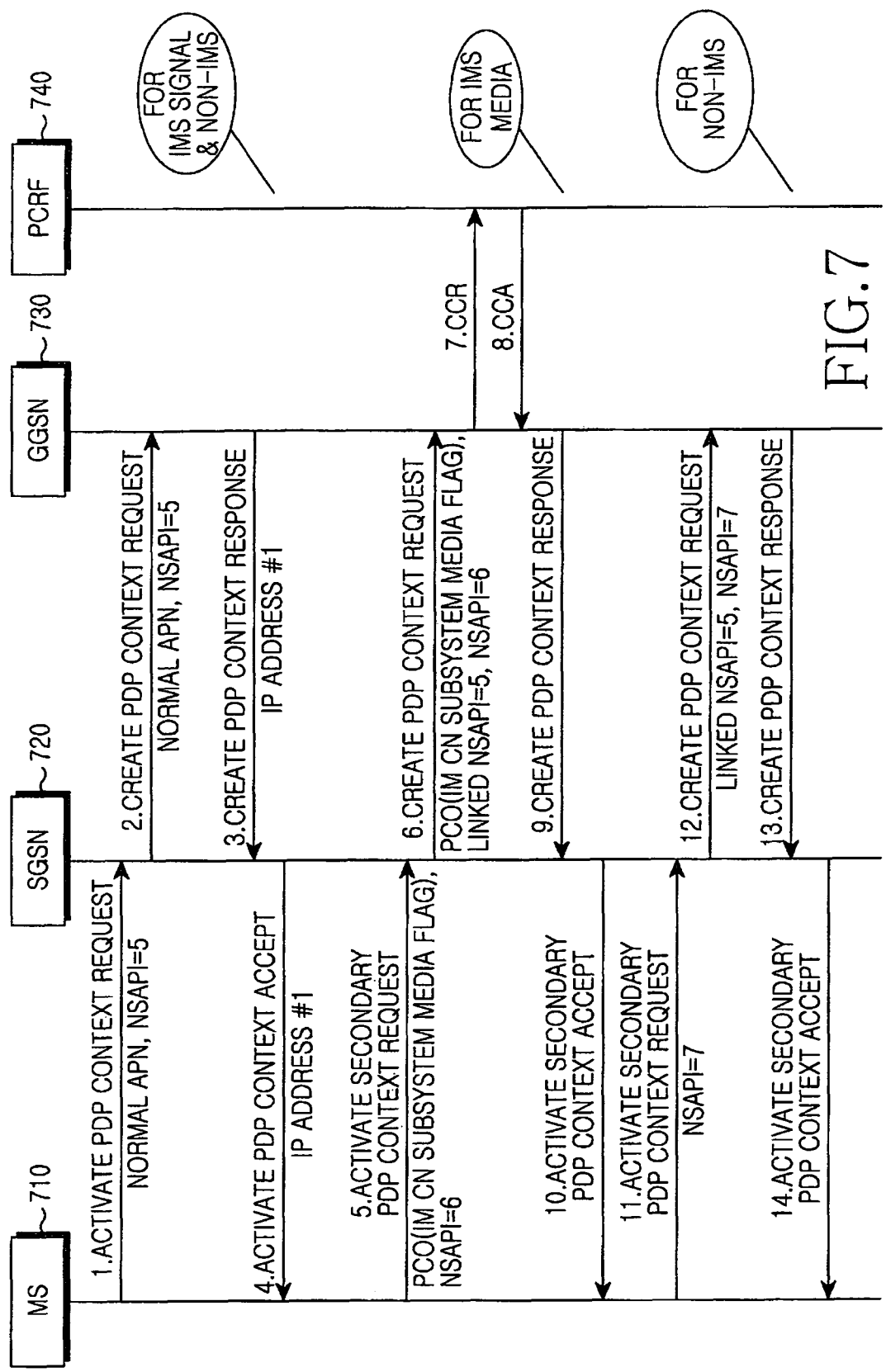
FIG. 7 illustrates a PDP context generation of the general-purpose signaling without IMS APN according to an exemplary embodiment of the present invention.

FIG. 7 illustrates a PDP context generation (steps 1~14) of the general-purpose signaling without an IMS APN according to an exemplary embodiment of the present invention.

Although the IMS APN is not included in a primary PDP context (steps 1 and 2) generated to use for the general purposes, the GGSN determines that media data for the IMS service is included when the generated secondary PDP context includes IM CN Subsystem Media Flag (steps 5 and 6). When the IM CN Subsystem Media Flag is not included, the GGSN determines that no media data for the IMS service is included. That is, the IMS service is available without using the IMS APN.

Figure 8:
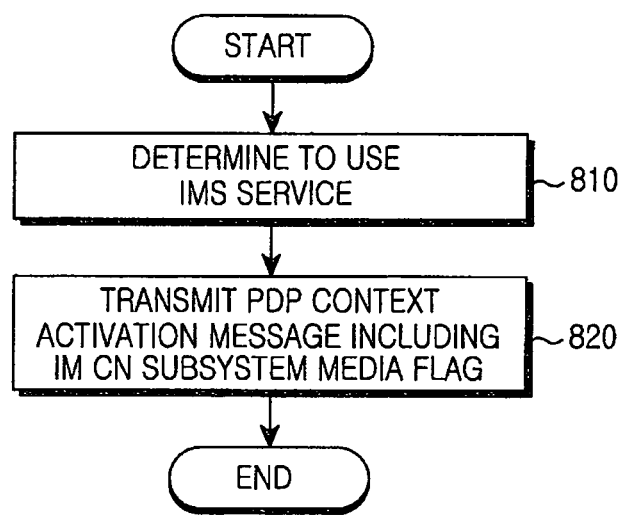
FIG. 8 illustrates operations of a terminal when the PDP context is generated according to an exemplary embodiment of the present invention.

FIG. 8 illustrates operations of a terminal when the PDP context is generated according to an exemplary embodiment of the present invention.

Determining to use the IMS service in step 810, the terminal transmits a PDP context activation message including the PCO "IM CN Subsystem Media Flag" to a Serving GPRS Supporting Node (SGSN) in step 820.

When the PDP context activation message is for a primary PDP context message and dedicated for the IMS, the terminal can indicate whether the media flow is included or not using the APN. Next, the terminal finishes this process.

Figure 9:
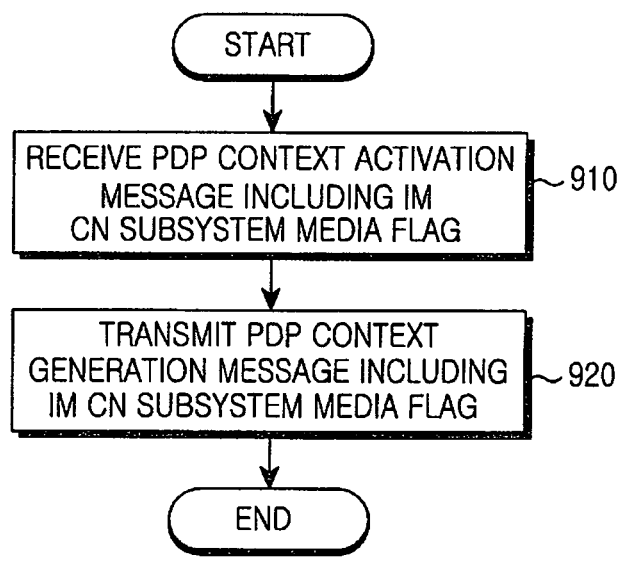
FIG. 9 illustrates operations of an SGSN when the PDP context is generated according to an exemplary embodiment of the present invention.

FIG. 9 illustrates operations of an SGSN when the PDP context is generated according to an exemplary embodiment of the present invention.

When receiving the PDP context activation message including the PCO "IM CN Subsystem Media Flag" in step 910, the SGSN transmits a PDP context generation message including the PCO "IM CN Subsystem Media Flag" to the GGSN in step 920. Next, the SGSN finishes this process.

Figure 10:
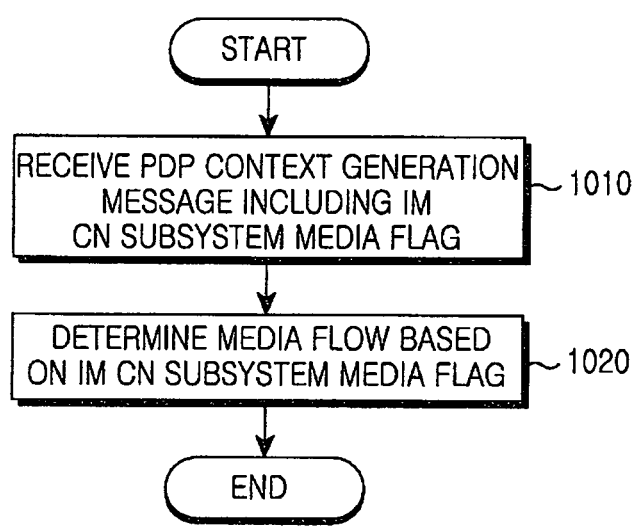
FIG. 10 illustrates operations of a GGSN when the PDP context is generated according to an exemplary embodiment of the present invention.

FIG. 10 illustrates operations of the GGSN when the PDP context is generated according to an exemplary embodiment of the present invention.

When receiving the general-purpose PDP context generation message including the PCO "IM CN Subsystem Media Flag" in step 1010, the GGSN determines from the IM CN Subsystem Media Flag whether the media flow is included or not in step 1020.

When the PDP context generation message is the IMS dedicated primary PDP context, the GGSN can determine based on the APN whether the media flow is included or not. Next, the GGSN finishes this process.

Figure 11:
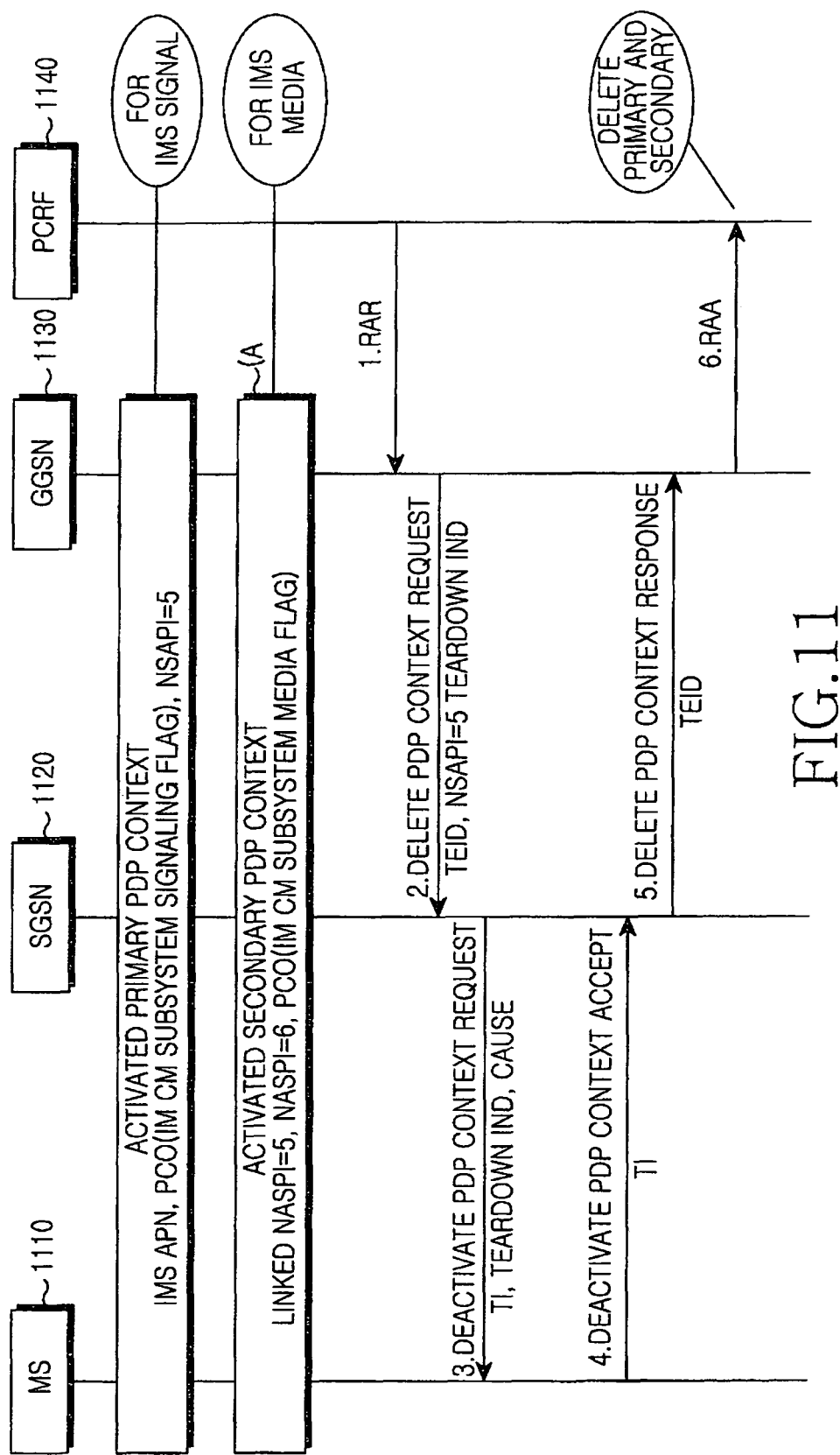
FIG. 11 illustrates a deregistration process according to an exemplary embodiment of the present invention.

FIG. 11 illustrates a deregistration process according to an exemplary embodiment of the present invention.

In the IMS deregistration of FIG. 11, the primary PDP context is generated for the IMS signaling only. It is possible to determine that the secondary PDP context is for the IMS because the primary PDP context is dedicated to the IMS signaling and the PCO "IM CN Subsystem Media Flag" is included. Accordingly, the primary PDP context and the secondary PDP context are deleted.

Figure 12:
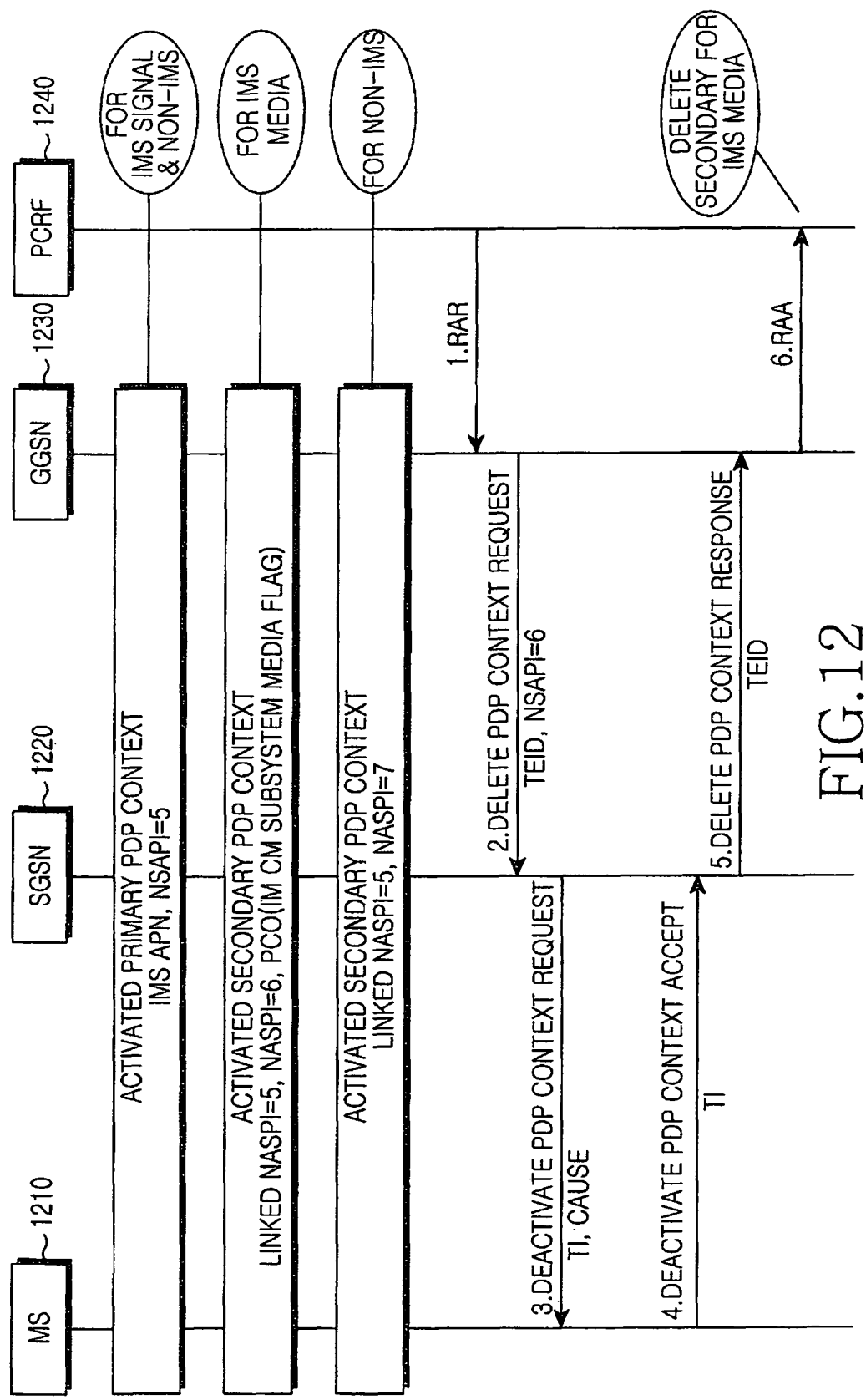
FIG. 12 illustrates another deregistration process according to an exemplary embodiment of the present invention.

FIG. 12 illustrates another deregistration process according to an exemplary embodiment of the present invention.

In the IM deregistration of FIG. 12, the primary PDP context is generated for general purposes. By contrast, since the secondary PDP context includes the PCO "IM CN Subsystem Media Flag", there exists the secondary PDP context for the IMS. Thus, the secondary PDP context for the IMS is deleted.

Figure 13:
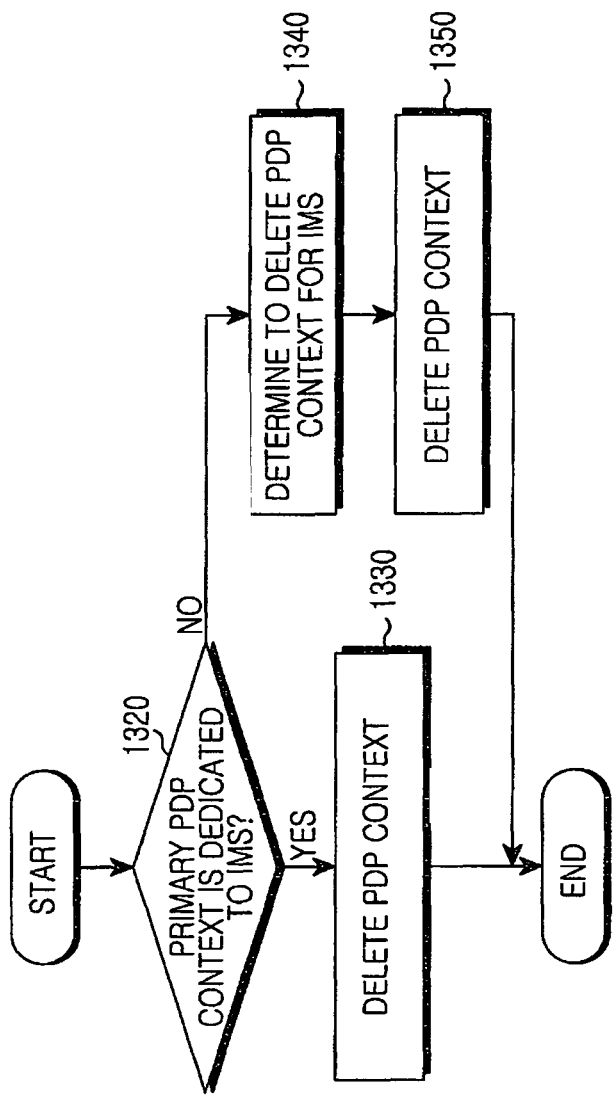
FIG. 13 illustrates operations of the GGSN in the deregistration according to an exemplary embodiment of the present invention.

FIG. 13 illustrates operations of the GGSN in the deregistration according to an exemplary embodiment of the present invention.

When the primary PDP context is dedicated to the IMS in step 1320, the GGSN deletes the primary PDP context for the IMS only and the secondary PDP context in step 1330.

When the primary PDP context is for general purposes in step 1320, the GGSN determines to delete the secondary PDP context for the IMS in step 1340, deletes the secondary PDP context in step 1350, and then finishes this process.

FIG. 14 illustrates a message format according to an exemplary embodiment of the present invention.

Container ID, which is a parameter defined in the PCO field to inform of the secondary PDP context including the media data for the IMS service, is newly defined as 0005H (0001H~0004H are existing values). This parameter value is changeable depending on the implementation and the progress of the standardization.

0005H indicates the IM CN Subsystem Media Flag. The length of container identifier contents is zero. The value of the container identifier contents field is neglected or null.

From the network to the terminal, the terminal can recognize the success or failure of the IMS media setup request based on the presence or absence of the IM CN Subsystem Media Flag.

Figure 15:
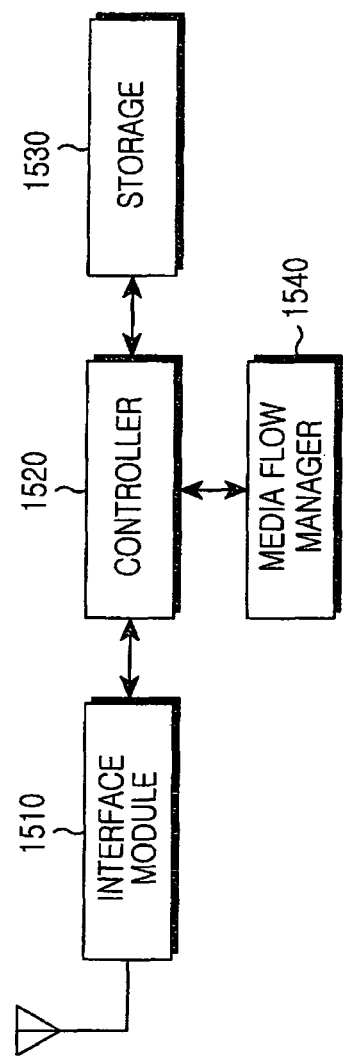
FIG. 15 illustrates a structure of the terminal, the SGSN, and the GGSN according to an exemplary embodiment of the present invention.

FIG. 15 is a block diagram of the terminal, the SGSN, and the GGSN according to an exemplary embodiment of the present invention.

As for the terminal, an interface module 1510 communicates with other nodes and includes a Radio Frequency (RF) processor and a baseband processor. The RF processor converts a signal received on an antenna to a baseband signal and provides the baseband signal to the baseband processor. The RF processor converts a baseband signal output from the baseband processor to an RF signal transmittable over the air and transmits the RF signal over the antenna.

A controller 1520 controls the operations of the terminal. For example, the controller 1520 processes and controls video telephony and data communication. In addition to typical functions, the controller 1520 controls a media flow manager 1540 to generate a PDP context activation message including the IM CN Subsystem Media Flag when a PDP context message for the IMS service is generated.

When the PDP context message for the IMS service is generated, the media flow manager 1540 generates the PDP context activation message including the IM CN Subsystem Media Flag according to an instruction and information from the controller 1520.

A storage 1530 contains programs for controlling the operations of the terminal and temporary data generating in the program executions.

As constructed above, the controller 1520 can function as the media flow manager 1540. Herein, the controller 1520 and the media flow manager 1540 are separately illustrated to distinguish their functions. Hence, in the actual implementation, the controller 1520 may process all or part of the functions of the media flow manager 1540.

As for the SGSN, an interface module 1510 communicates with other nodes and includes a wire signal processor and a baseband processor. The wire signal processor converts a received signal to a baseband signal and provides the baseband signal to the baseband processor. The wire signal processor converts a baseband signal output from the baseband processor to a transmittable signal and transmits the signal.

A controller 1520 controls the operations of the SGSN. For example, the controller 1520 processes and controls data communications. In addition to typical functions, upon receiving the PDP context activation message including the IM CN Subsystem Media Flag, the controller 1520 controls a media flow manager 1540 to transmit the PDP context generation message to the GGSN by including the information.

Receiving the PDP context activation message including the IM CN Subsystem Media Flag, the media flow manager 1540 transmits the PDP context generation message to the GGSN by including the PDP context activation message according to the direction and the information from the controller 1520.

The storage 1530 contains programs for controlling the operations of the SGSN and temporary data generating in the program executions.

As constructed above, the controller 1520 can function as the media flow manager 1540. Herein, the controller 1520 and the media flow manager 1540 are separately illustrated to distinguish their functions. Hence, in the actual implementation, the controller 1520 may process all or part of the functions of the media flow manager 1540.

As for the GGSN, an interface module 1510 communicates with other nodes and includes a wire signal processor and a baseband processor. The wire signal processor converts a received signal to a baseband signal and provides the baseband signal to the baseband processor. The wire signal processor converts a baseband signal output from the baseband processor to a transmittable signal and transmits the signal.

A controller 1520 controls the operations of the GGSN. For example, the controller 1520 processes and controls data communications. In addition to typical functions, the controller 1520 controls the media flow manager 1540 to determine whether the PDP context generated by the PDP context generation message includes the IMS media data or not. When the PDP context is deleted, the controller 1520 controls the media flow manager 1540 to delete the PDP context.

When the PDP context generation message includes the PCO "IM CN Subsystem Media Flag", the media flow manager 1540 determines that the PDP context generated by the PDP context generation message includes the IMS media data. When the PDP context is deleted, the media flow manager 1540 distinguishes and deletes the PDP context for the IMS based on the deleted PDP context.

The storage 1530 contains programs for controlling the operations of the GGSN and temporary data generating in the program executions.

As constructed above, the controller 1520 can function as the media flow manager 1540. Herein, the controller 1520 and the media flow manager 1540 are separately illustrated to distinguish their functions. Hence, in the actual implementation, the controller 1520 may process all or part of the functions of the media flow manager 1540.

As set forth above, the GGSN can determine whether the subsequent secondary PDP context is used for the IMS service or the non-IMS service, regardless of the IMS APN provided from the terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for indicating an IP Multimedia Subsystem (IMS) data flow in a mobile communication system, the system comprising:

a terminal for, after a primary Packet Data Protocol (PDP) context for general purposes is generated, transmitting a secondary PDP context activation message including an IM CN Subsystem Media Flag stored in a Protocol Configuration Options (PCO) field, as a secondary PDP context to be used in an IMS system is generated;

a Serving GPRS Supporting Node (SGSN) for receiving the secondary PDP context activation message and transmitting a secondary PDP context generation message including the IM CN Subsystem Media Flag when the IM CN Subsystem Media Flag is contained in the secondary PDP context activation message; and a Gateway GPRS Support Node (GGSN) for receiving the secondary PDP context generation message and determining that the secondary PDP context carries IMS data when there is the IM CN Subsystem Media Flag without an authorization token being generated by a Policy Decision Function (PDF);

wherein the PCO field includes a Container ID to inform of the secondary PDP context including media data for an IMS service;

wherein if the primary PDP context is dedicated to the IMS, the GGSN deletes the primary PDP context for the IMS and the secondary PDP context; and wherein if the primary PDP context is not dedicated to the IMS, the GGSN deletes the secondary PDP context.

2. The system of claim 1, wherein the terminal transmits another secondary PDP context activation message including another IM CN Subsystem Media Flag to the SGSN when another primary PDP context dedicated to the IMS system is generated.

3. The system of claim 1, wherein when the secondary PDP context after the general-purpose primary PDP context includes the IM CN Subsystem Media Flag using the IMS data in an IMS deregistration of the terminal, the GGSN determines that the secondary PDP context carries the IMS data and deletes the secondary PDP context.

4. A terminal for indicating an IP Multimedia Subsystem (IMS) data flow in a mobile communication system, the terminal comprising:

a communication module for communicating with other nodes; and a media flow manager for communicating with the other nodes through the communication module and transmitting a secondary Packet Data Protocol (PDP) context activation message including an IM CN Subsystem Media Flag stored in a Protocol Configuration Options (PCO) field, as a secondary PDP context to be used in an IMS system is generated after a general-purpose primary PDP context is generated;

wherein the secondary PDP context generation message is determined to carry IMS data when the IM CN Subsystem Media Flag is detected without an authorization token being generated by a Policy Decision Function (PDF); wherein the PCO field includes a Container ID to inform of the secondary PDP context including media data for an IMS service;

wherein if the primary PDP context is dedicated to the IMS, a GGSN deletes the primary PDP context for the IMS and the secondary PDP context; and wherein if the primary PDP context is not dedicated to the IMS, the GGSN deletes the secondary PDP context.

5. The terminal of claim 4, wherein the media flow manager transmits another secondary PDP context activation message including another IM CN Subsystem Media Flag to a Serving GPRS Supporting Node (SGSN) when another primary PDP context dedicated to the IMS system is generated.

6. A Gateway GPRS Support Node (GGSN) for indicating an IP Multimedia Subsystem (IMS) data flow in a mobile communication system, the GGSN comprising:
   a communication module for communicating with other nodes; and
   a media flow manager for communicating with the other nodes through the communication module, receiving a secondary Packet Data Protocol (PDP) context generation message, and determining that a secondary PDP context carries IMS data when there is an IM CN Subsystem Media Flag stored in a Protocol Configuration Options (PCO) field;
   wherein the secondary PDP context generation message is determined to carry IMS data when the IM CN Subsystem Media Flag is detected without an authorization token being generated by a Policy Decision Function (PDF); and
   wherein the PCO field includes a Container ID to inform of the secondary PDP context including media data for an IMS service;
   wherein if a primary PDP context is dedicated to the IMS, the GGSN deletes the primary PDP context for the IMS and the secondary PDP context; and
   wherein if the primary PDP context is not dedicated to the IMS, the GGSN deletes the secondary PDP context.

7. The GGSN of claim 6, wherein the media flow manager determines that the secondary PDP context carries the IMS data and deletes the secondary PDP context when the secondary PDP context after a general-purpose primary PDP context includes the 1M CN Subsystem Media Flag in an IMS deregistration of a terminal.

8. A method of a terminal for indicating an IP Multimedia Subsystem (IMS) data flow in a mobile communication system, the method comprising:
   when generating a secondary Packet Data Protocol (PDP) context to be used in an IMS system after generating a general-purpose primary PDP context, including an IM CN Subsystem Media Flag stored in a Protocol Configuration Options (PCO) field in a secondary PDP context activation message; and
   transmitting the secondary PDP context activation message to a Serving GPRS Supporting Node (SGSN);
   wherein the secondary PDP context generation message is determined to carry IMS data when the IM CN Subsystem Media Flag is detected without an authorization token being generated by a Policy Decision Function (PDF); and
   wherein the PCO field includes a Container ID to inform of the secondary PDP context including media data for an IMS service;
   wherein if the primary PDP context is dedicated to the IMS, a GGSN deletes the primary PDP context for the IMS and the secondary PDP context; and
   wherein if the primary PDP context is not dedicated to the IMS, the GGSN deletes the secondary PDP context.

9. The method of claim 8, further comprising:
   when generating another primary PDP context dedicated to the IMS system, including another IM CN Subsystem Media Flag in another secondary PDP context activation message; and
   transmitting the another secondary PDP context activation message to the SGSN.

10. A method of a Gateway GPRS Support Node (GGSN) for determining an IP Multimedia Subsystem (IMS) data flow in a mobile communication system, the method comprising:
    receiving a secondary Packet Data Protocol (PDP) context generation message; and
    determining that the secondary PDP context carries IMS data when a secondary PDP context generation message comprises an IM CN Subsystem Media Flag stored in a Protocol Configuration Options (PCO) field;
    wherein the secondary PDP context generation message is determined to carry IMS data when the IM CN Subsystem Media Flag is detected without an authorization token being generated by a Policy Decision Function (PDF);
    wherein the PCO field includes a Container ID to inform of the secondary PDP context including media data for an IMS service;
    wherein if a primary PDP context is dedicated to the IMS, the GGSN deletes the primary PDP context for the IMS and the secondary PDP context; and
    wherein if the primary PDP context is not dedicated to the IMS, the GGSN deletes the secondary PDP context.

11. An IP Multimedia Subsystem (IMS) deregistering method of a Gateway GPRS Support Node (GGSN) in a mobile communication system, the method comprising:
    checking whether there exists an IM CN Subsystem Media Flag stored in a Protocol Configuration Options (PCO) field in a secondary Packet Data Protocol (PDP) context after generating a general-purpose primary PDP context; and
    determining that the secondary PDP context carries IMS data and deleting the secondary PDP context when there exists the IM CN Subsystem Media Flag;
    wherein the secondary PDP context generation message is determined to carry IMS data when the IM CN Subsystem Media Flag is detected without an authorization token being generated by a Policy Decision Function (PDF); and
    wherein the PCO field includes a Container ID to inform of the secondary PDP context including media data for an IMS service;
    wherein if a primary PDP context is dedicated to the IMS, the GGSN deletes the primary PDP context for the IMS and the secondary PDP context; and
    wherein if the primary PDP context is not dedicated to the IMS, the GGSN deletes the secondary PDP context.

12. A method of a Serving GPRS Supporting Node (SGSN) for indicating an IP Multimedia Subsystem (IMS) data flow in a mobile communication system, the method comprising:
    receiving a Packet Data Protocol (PDP) context activation message;
    including an IM CN Subsystem Media Flag stored in a Protocol Configuration Options (PCO) field to a PDP context generation message when the IM CN Subsystem Media Flag is present in the PDP context activation message; and
    transmitting the PDP context generation message including the 1M CN Subsystem Media Flag to a Gateway GPRS Support Node (GGSN);

wherein a secondary PDP context generation message is determined to carry IMS data when the IM CN Subsystem Media Flag is detected without an authorization token being generated by a Policy Decision Function (PDF); and wherein the PCO field includes a Container ID to inform of the secondary PDP context including media data for an IMS service;

wherein if a primary PDP context is dedicated to the IMS, the GGSN deletes the primary PDP context for the IMS and the secondary PDP context; and wherein if the primary PDP context is not dedicated to the IMS, the GGSN deletes the secondary PDP context.

13. A Serving GPRS Supporting Node (SGSN) for indicating an IP Multimedia Subsystem (IMS) data flow in a mobile communication system, the SGSN comprising:

a communication module for communicating with other nodes; and a media flow manager for communicating with the other nodes through the communication module, receiving a Packet Data Protocol (PDP) context activation message, including an IM CN Subsystem Media Flag stored in a Protocol Configuration Options (PCO) field to a PDP context generation message when the IM CN Subsystem Media Flag is present in the PDP context activation message, and transmitting the PDP context generation message including the IM CN Subsystem Media Flag to a Gateway GPRS Support Node (GGSN);

wherein a secondary PDP context generation message is determined to carry IMS data when the IM CN Subsystem Media Flag is detected without an authorization token being generated by a Policy Decision Function (PDF);

wherein the PCO field includes a Container ID to inform of the secondary PDP context including media data for an IMS service;

wherein if a primary PDP context is dedicated to the IMS, the GGSN deletes the primary PDP context for the IMS and a secondary PDP context; and wherein if the primary PDP context is not dedicated to the IMS, the GGSN deletes the secondary PDP context.

* * * * *